July 7, 1970                V. NAVE                3,519,249
STEEL GUARD RAIL GREASER
Filed Dec. 3, 1968
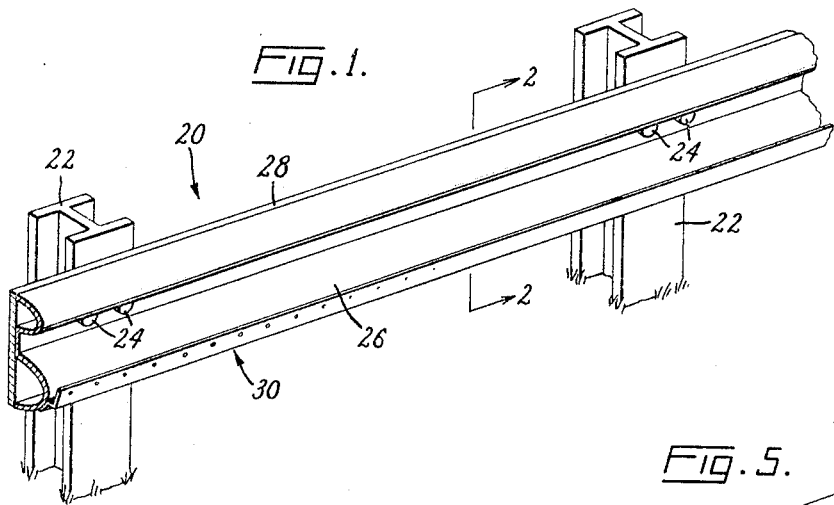
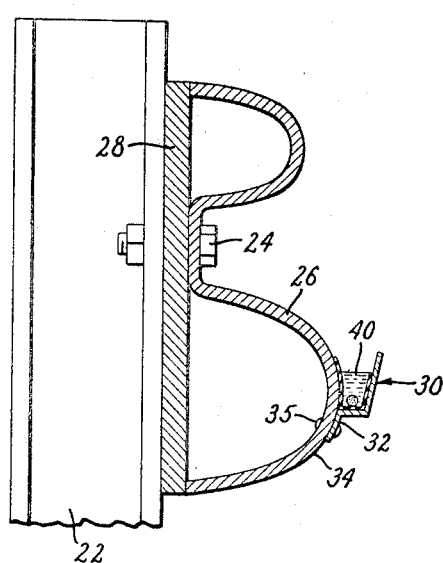
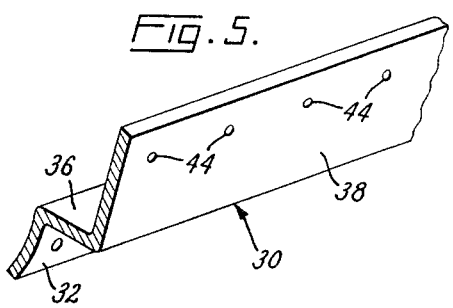
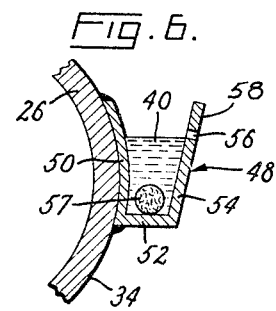
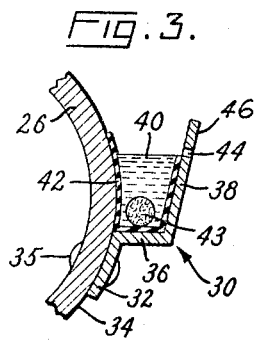
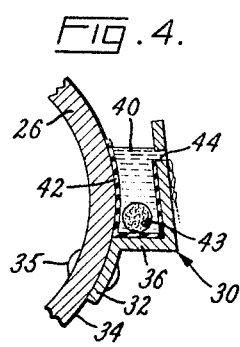
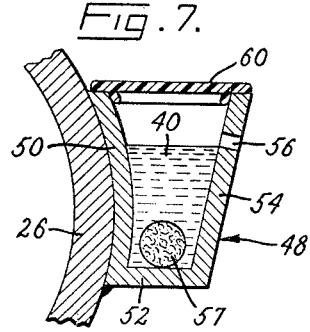
INVENTOR:
VINCENT NAVE,
BY *Albert W. Hilburger*
ATTORNEY

United States Patent Office 3,519,249
Patented July 7, 1970

3,519,249
STEEL GUARD RAIL GREASER
Vincent Nave, 20 Bennett St.,
North Providence, R.I. 02904
Filed Dec. 3, 1968, Ser. No. 780,828
Int. Cl. E01f *15/00*
U.S. Cl. 256—13.1          6 Claims

ABSTRACT OF THE DISCLOSURE

Apparatus for dispensing an oleaginous fluid in the event of an impact of a vehicle against a guard rail. A trough mounted on the guard rail serves as a fluid reservoir and is yieldable upon impact by the vehicle. The resulting reduction of the trough's volume causes the fluid to flow between the vehicle and the guard rail, thereby providing the opposed surfaces with lubrication. An absorbent material may be provided in the trough to restrict spillage of the fluid, and the outer wall may be provided with apertures to further aid in passage of the fluid out of the trough upon impact.

---

This invention relates generally to guard rails of the type located adjacent thoroughfares, and more particularly to a guard rail adapted to dispense an oleaginous fluid upon impact by a vehicle, thereby lubricating the surfaces of contact and enabling the vehicle to glide to a halt rather than causing it to stop abruptly.

It is customary to provide guard rails alongside roads and highways, particularly at dangerous locations such as adjacent steeply descending slopes and bodies of water. Guard rails serve as barriers to prevent the undesirable travel of motor vehicles and the like toward such locations in the event of an accident or loss of control on the part of the driver. For this purpose, a guard rail must be of sufficient strength to withstand the impact of the vehicle. On the other hand, a guard rail is preferably not of a construction which causes serious injury or possibly death to an occupant of a motor vehicle because of its failure to gradually retard motion of the vehicle. With this fact in mind, various expedients have been suggested for the construction of guard rails with sufficient resiliency or yieldability to prevent serious harm to occupants of the vehicle. Although such guard rail constructions have been moderately successful, they have generally been unable to successfully bring the vehicle to a halt in a gradual manner so as to prevent serious injury to the occupants of the vehicle.

To this end, the present invention pertains to apparatus for dispensing an oleaginous fluid in the event of an impact of a vehicle against the guard rail. In this manner the vehicle, striking the guard rail at any other but a very low angle of deflection, is aided in its ability to slide along the guard rail with the result that the vehicle can be brought to a halt over a substantial distance. Thus serious injuries to the occupants of the vehicle can be reduced or prevented in the majority of instances in which a vehicle strikes a guard rail at an angle. For this purpose, a trough mounted on and protruding from an outermost surface of the guard rail serves as a fluid reservoir and is yieldable upon impact by the vehicle. The resulting reduction of the trough's volume upon impact causes the fluid in the trough to flow between the vehicle and the guard rail, thereby providing opposed surfaces of the guard rail and the vehicle with lubrication. An absorbent material may be provided in the trough to restrict spillage of the fluid and the outer wall of the trough may be provided with apertures to further aid in passage of the fluid out of the trough upon impact.

Accordingly, an object of the invention is to provide a new and improved fluid dispensing apparatus for use with a guard rail.

Another object of the invention is the provision of a new and improved apparatus adapted for use with a guard rail and operable for dispensing an oleaginous fluid in the event of an impact of a vehicle against a guard rail.

Still another object of the invention is the provision of a vehicular barrier assembly which includes a structural member for retarding motion of a vehicle in an undesirable direction and a yieldable reservoir on the structural member normally adapted to contain an oleaginous fluid, but yieldable upon impact by the vehicle to release the fluid between the vehicle and the structural member.

Other and further objects and advantages of the invention will be obvious or will be disclosed in the following specification taken together with the accompanying drawings.

In the drawings, wherein like numerals refer to like parts:

FIG. 1 is a perspective view of a portion of a vehicular barrier embodying the invention;

FIG. 2 is a cross section view generally taken along the line 2—2 in FIG. 1;

FIG. 3 is a detail view, in section, of certain parts shown in FIG. 2 in their normal condition;

FIG. 4 is a view similar to FIG. 3 but showing certain parts in a yielding condition;

FIG. 5 is a detail perspective view of a part of the vehicular barrier;

FIG. 6 is another view similar to FIG. 3 but showing another embodiment of the invention; and FIG. 7 is a view similar to FIG. 6 but showing another embodiment of the invention.

Refer now to the drawings and initially to FIG. 1 which illustrates a vehicular barrier 20 which is generally similar in construction to barriers provided alongside roads, highways, or other thoroughfares. The barrier 20 includes a plurality of support posts 22 anchored in the ground in spaced upright positions. Appropriate fasteners 24 serve to mount a guard rail 26 to the support posts 22. The guard rail 26 extends substantially parallel with the ground and a backing plate 28 is preferably provided intermediate the guard rail 26 and the support post 22 for improving the strength characteristics of the barrier 20.

As described thus far, the vehicular barrier 20 is substantially similar to conventional barriers which are common alongside most highways. However, the invention herein relates specifically to a fluid dispensing apparatus or trough 30 on the guard rail 26 which normally serves as a fluid reservoir but which is yieldable upon impact by a vehicle (not shown) to lubricate the opposed surfaces of the vehicle and the guard rail 26. The trough 30 has an arcuate flange 32 appropriately shaped for reception on a convex surface 34 of the guard rail 26, and the flange 32 is suitably attached to the guard rail as by rivets 35 or by welding. As seen especially in FIGS. 2, 3, and 4, the flange 32 extends downwardly and rearwardly (to the left) from an outwardly extending base 36, and an outer wall 38 extends upwardly and preferably outwardly from an outer extremity of the base 36. The entire trough 30 is preferably of a thickness or gage substantially less than that of the guard rail 26 and is of a resilient material such as spring steel. Alternatively, the flange 32 and the base 36 may be of moderate thickness and the outer wall 38 may have a reduced thickness as compared with the flange and the base.

An oleaginous fluid 40 is provided in the trough 30 and in order to assure that the fluid is retained in the trough, a liner 42 of a suitable fluid repellent material may be appropriately provided. Also, an absorbent material, possibly in the form of a cotton cord 43, may be provided and lie in the trough 30 to restrict spillage of the fluid or its issuance from the trough 30 except upon impact of the barrier 20 by a vehicle. Additionally, as seen especially in FIG. 5, a plurality of spaced holes or apertures 44 may be provided in the outer wall 38. The apertures 44 are preferably positioned and the level of the fluid 40 suitably determined to normally prevent flow of the fluid from the trough 30. However, in the event that a vehicle impacts against the barrier 20, the outer wall 38 yields, moving from its normal position (FIG. 3) to a yielding position (FIG. 4). When this occurs, the volume within the trough 30 is substantially reduced, thereby causing the fluid to attain a level which is higher than the apertures 44 such that it issues from the apertures 44 onto an outer surface 46 of the outer wall 38. In the event of a particularly severe impact, the fluid 40 is caused to actually overflow the trough 30 thereby even further lubricating the outer surface 46. In this manner, the vehicle is encouraged to continue moving, although at a progressively decreasing rate, thereby providing the operator an opportunity to regain control of the vehicle and minimizing injuries resulting from too rapid a rate of deceleration.

Although only one trough 30 is shown in FIGS. 1 and 2, mounted on a lower lobe of the guard rail 26, it might be desirable to mount a pair of troughs 30 on upper and lower lobes, respectively, of the guard rail. Such a construction would be particularly advantageous along those portions of a highway which are heavily travelled.

Another embodiment of the invention is illustrated in FIG. 6 and comprises a fluid dispensing apparatus or trough 48 which is somewhat modified from the trough 30 previously described. Specifically, the trough 48 is substantially U-shaped in cross-section and includes a flange 50, a base 52, and an outer wall 54. The flange 50 is arcuately shaped in a manner appropriate for reception on the convex surface 34 of the guard rail 26 and is suitably attached to the guard rail as by rivets (not shown) or by welding. The flange 50 extends generally upwardly from the outwardly extending base 52, and the outer wall 54 extends upwardly and preferably outwardly from an outer extremity of the base 52.

As in the instance of the trough 30, the entire trough 48 is preferably of a thickness or gage substantially less than that of the guard rail 26 and is of a resilient material such as spring steel. Alternatively, the flange 50 and the base 52 may be of moderate thickness and the outer wall 54 may have a reduced thickness as compared with the flange and the base. A plurality of spaced holes or apertures 56 are provided in the outer wall 54 and the level of the fluid 40 is suitably determined to normally prevent flow of the fluid from the trough 48. Also, an absorbent material such as a cotton cord 57 may be provided and lie along the base 52 to restrict undesriable spillage or issuance of the fluid 40 from the trough 48. Upon impact of a vehicle against the barrier 20, the fluid 40 flows through the apertures 56 and possibly even overflows the trough 48 thereby lubricating an outer surface 58 of the outer wall 54.

Yet another embodiment of the invention is illustrated in FIG. 7 and provides a construction similar to that indicated in FIG. 6 (although it could be a construction similar to that indicated in FIG. 3), but includes a cover 60 suitable for preventing contamination of the fluid 40 with rain and solid impurities in the air.

What is claimed is:

1. A vehicular barrier assembly comprising: structural means including a guard rail for retarding motion of a vehicle in an undesirable direction and a trough mounted on said guard rail including an outer wall of yieldable material protruding outwardly and upwardly from said guard rail and having a plurality of apertures therein, said trough normally adapted to retain an oleaginous fluid at a level lower than said apertures, and said outer wall being responsive under impact by the vehicle to yield in the direction of said guard rail and thereby release said fluid through said apertures and between the vehicle and said guard rail.

2. An assembly as set forth in claim 1 wherein said trough includes a liner for preventing leakage of the fluid therefrom.

3. An assembly as set forth in claim 1 wherein said trough includes absorbent means for releasably retaining the fluid therewithin.

4. An assembly as set forth in claim 3 wherein said trough includes a base and said absorbent means includes a cord supported on said base and extending along said trough.

5. An assembly as set forth in claim 1 wherein said structural means includes a plurality of support posts anchored in spaced upright position adjacent a vehicular thoroughfare, and said guard rail is mounted on said posts and extends substantially parallel with the thoroughfare.

6. An assembly as set forth in claim 5 wherein said trough includes a base and an absorbent cord supported on said base and extending along said trough for releasably retaining the fluid therewithin.

References Cited
UNITED STATES PATENTS 2,279,942    4/1942    Hausherr _____ 256—13.1
2,776,116    1/1957    Brickman _____ 256—13.1

DENNIS L. TAYLOR, Primary Examiner